March 25, 1947. E. C. HORTON 2,418,031
WINDOW CONTROL FOR MOTOR VEHICLES
Filed Nov. 28, 1942 2 Sheets-Sheet 1
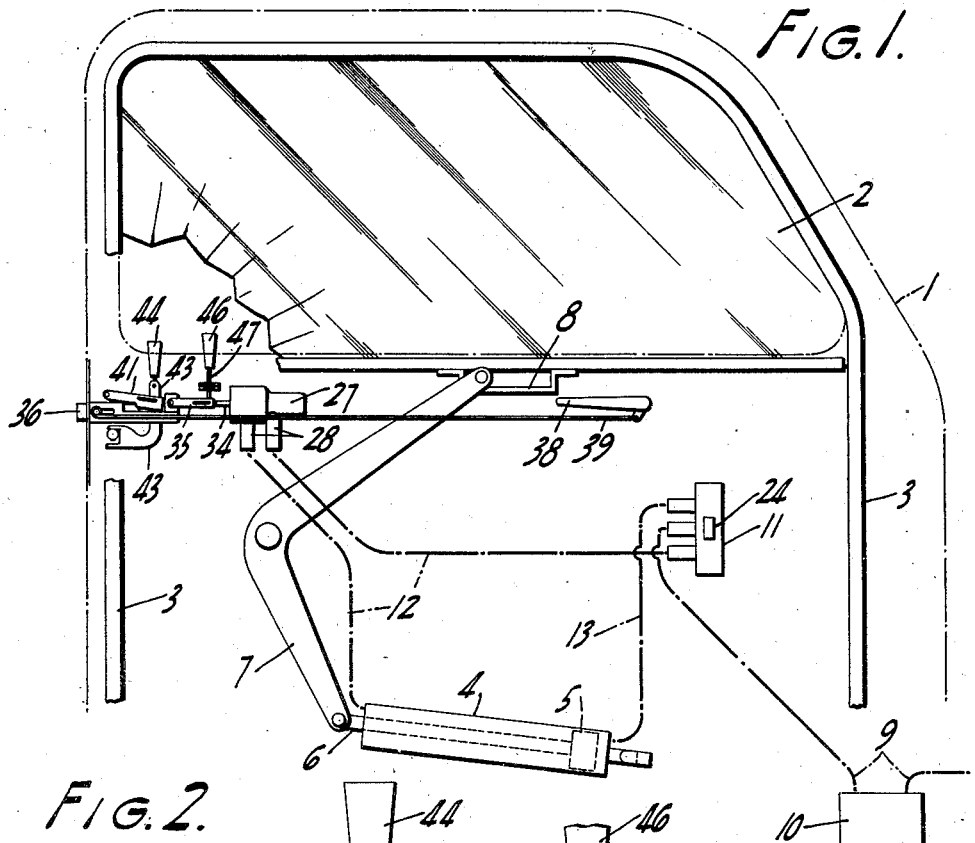
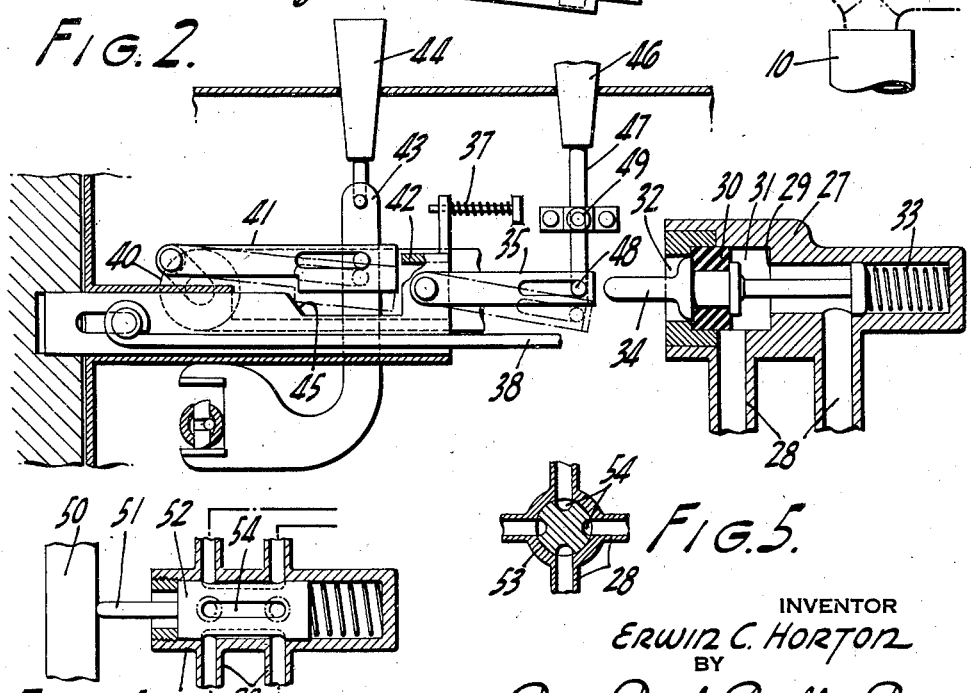
INVENTOR
ERWIN C. HORTON
BY
Bean, Brooks, Buckley & Bean.
ATTORNEYS March 25, 1947.  E. C. HORTON  2,418,031
WINDOW CONTROL FOR MOTOR VEHICLES
Filed Nov. 28, 1942  2 Sheets-Sheet 2

INVENTOR
ERWIN C. HORTON
BY
Bean Brooks, Buckley + Bean
ATTORNEYS

Patented Mar. 25, 1947

2,418,031

UNITED STATES PATENT OFFICE 2,418,031

WINDOW CONTROL FOR MOTOR VEHICLES

Erwin C. Horton, Hamburg, N. Y., assignor to Trico Products Corporation, Buffalo, N. Y.

Application November 28, 1942, Serial No. 467,231

8 Claims. (Cl. 180—82)

This invention relates to a window system for motor vehicles, and it has for its primary object to provide means to insure the automatic closing of any open window or windows when parking the vehicle.

It has recently been proposed to operate the windows of automobiles by motive power, more particularly of the fluid pressure type, so that by the selective manipulation of a control the window may be power operated to and from a closed position. In one phase the present invention contemplates the provision of an auxiliary control adapted to be manipulated during some operation essential to the proper parking of the vehicle, such as the locking of the doors or the application of the emergency brakes, to set in motion the window system for closing any window which may be open at the time.

In the accompanying drawings,

Fig. 1 is a diagrammatic showing of a window system embodying the present invention under the control of the door locking means;

Fig. 2 is an enlarged and fragmentary sectional view thereof illustrating more clearly the auxiliary or automatic control;

Fig. 4 is a fragmentary elevation of a modified embodiment of the invention under the control of the emergency brake operator;

Fig. 5 is a transverse sectional view through the modified control;

Figure 6:
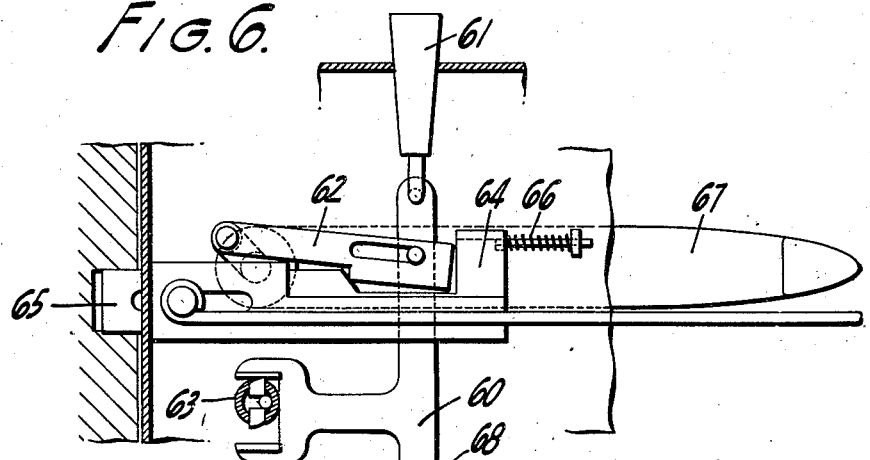
Fig. 6 is a fragmentary view of a modification over the embodiment of Figs. 1 and 2.

Referring more particularly to the drawings, the numeral 1 designates a door of an automobile having a window panel 2 slidable vertically in guideways 3 which extend down into the window well of the door. The motive power for opening and closing the window is derived herein from a fluid motor 4 having a piston 5 connected by its rod 6 and bell crank lever 7 to the bracket 8 on the lower edge of the window panel. The intake manifold serves as a practical source of operating pressure, the suction line 9 leading therefrom through a vacuum or storage reservoir 10 to the window system control 11 and from thence by conduits 12 and 13 to the opposite ends of the motor chamber.

Figure 3:
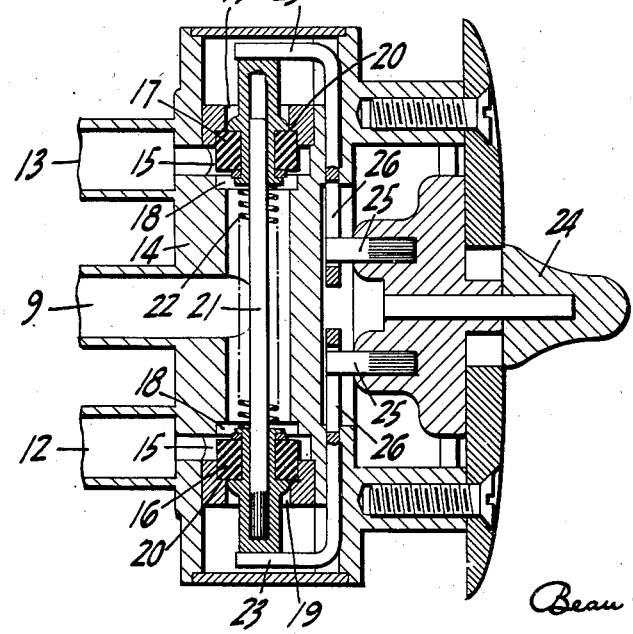
Fig. 3 is a detailed sectional view through the main control for the window system.

The control may be of any satisfactory type but preferably one permitting normal communication between the pressure source and the motor chamber at both sides of the piston to hold the latter with a balanced pressure and thereby enable a ready response when either side of the chamber is vented to the atmosphere. One type of valve for accomplishing this is illustrated in Fig. 3 wherein the body 14 has terminal chambers 15 in which are arranged the valves 16 and 17. The suction supply passage 9 normally communicates with the motor passages 12 and 13 through valve seats 18. Each valve chamber also has an atmospheric port 19 opening through a seat 20. The valves are relatively movable and may have guided movement by means of a rod 21 which is fixed to one valve 16 and slidably received by the other valve 17. An interposed spring 22 expands to hold the valves yieldingly engaged with their atmospheric port seats, the arrangement being such that the valves may be selectively displaced to engage the respective one of the suction port seats 18 and open the adjacent atmospheric port whereupon the relatively higher atmospheric pressure will unbalance and actuate the motor piston. This selective operation of the valves is made possible by the depressor slides 23 connected to a common actuator 24 by pins 25 engaging in slots 26, the provided play connection enabling one pin to idle with respect to its slide 23 when the other pin is effective on the companion slide. It is, therefore, possible to raise or lower the window panel by simply moving the actuator in the corresponding direction.

It sometimes happens that a motorist will park his automobile and inadvertently leave a window open, inviting unlawful entry by another, and it is the primary aim of this invention to eliminate such occurrence. To this end means are provided to operate the window system for closing an open window automatic with the safe parking of the vehicle.

In Figs. 1 and 2 an auxiliary control valve is depicted, the same being interposed in the conduit 12 and arranged to vent the corresponding side of the motor chamber for effecting a closing of the window panel. This auxiliary valve is shown as comprising a casing body 27 with two passages or nipples 28 intercommunicating through a normally opened valve seat 29. A valve 30 operating in a chamber 31 is normally seated over an atmospheric port 32 by a spring 33. A stem 34 protrudes into the path of a presettable actuator part 35 which in turn is connected to the door latch 36 to move back and forth therewith. Consequently, when the door is swung closed and thereby causes the latch to recede against the action of its spring 37 before engaging its keeper plate, the actuator 35 will move the valve 30 to interrupt the interpassage communication and vent the motor chamber to the source of higher pressure as provided by the outside atmosphere. This will effect a window closing operation of the motor.

The door locking mechanism may be of any approved construction, that illustrated being of a well known manufacture and may therefore be now briefly described. The latch 36 may be retracted by the inner handle 38 to which it is connected by the link 39, or it may be withdrawn by the exterior handle 40 through a push link 41, the latter being normally disposed to contact a hollow lug 42 rigid with the latch and to which the valve actuator 35 is pivotally connected. The push link may be depressed from the plane of the lug 42 by a lock bar 43, and its button 44, in which lowered position the push link will idly move by or through the lug without actuating it. To lock the door this button 44 is depressed and when the door is being closed the outside handle 40 is displaced to prevent the cam face 45 restoring the lock bar. Consequently, the latch merely idles back except for its shifting action of the actuator 35.

Should it be desired not to close the windows when the door is closed a displacing button 46 has its stem 47 connected by a play connection 48 to the actuator in a manner to displace the latter from the plane of the valve stem 34. Therefore, the latch, when moved, will not strike the valve stem and the functioning of the window system will be avoided. In its depressed position the button may be held by a detent 49 engaging its stem.

From the foregoing it will be observed that automatic with the parking of his car the motorist will set in operation the window actuating system which will function to close the associated window or windows, if open at the time. This window closing function is accomplished by and incidental to some manipulation essential to the proper parking of the vehicle. It may be accomplished by a manipulation or operation other than the door locking action. For example, it may be performed by and during application of the emergency brake as an actuator. Such an arrangement is shown in Fig. 4 wherein the emergency brake lever 50, when operated, will contact the stem 51 of a valve 52 in the casing body 53 which may be modified over the valve 30 in Fig. 1 by having plural recesses 54, one for each window motor, to act in closing any and all open windows at the time of parking. The action of the window system is immediate upon operation of the lever.

Figure 7:
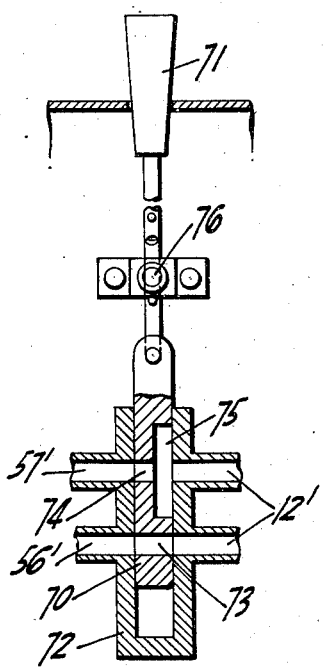
Fig. 7 is a similar view of the control eliminator for throwing out the automatic control when the latter is not wanted.

In the modification of Figs. 6 and 7, the auxiliary control embodies a casing body 55 having fluid passages 56 and 57 normally in communication through a recess 58 in the slide valve 59. The valve is directly connected to the lock bar 60 of the door locking mechanism, which bar is depressed by the button 61 to displace the push link 62. The usual key actuated lock 63 serves to restore the push link to its operative plane where it may engage the latch lug 64 and retract the latch 65 against the tension of its spring 66 upon rocking the exterior handle 67. A detent 68 will serve to hold the lock bar depressed. The passage 57 communicates with the motor chamber of the window operator, and when the slide valve 59 is depressed to the door locking position shown in Fig. 6, the valve recess 58 is shifted out of registration with the passage 57 to interrupt the normal pressure or suction line of communication and immediately following this and upon continued valve movement a recess 69 is moved over to vent the passage 57 to the atmosphere for providing the desired operating pressure differential. This differs primarily over the operation of the control in Fig. 1 in that the window system functions instantly upon depression of the button 61 without the cooperation of the latch. For eliminating the automatic control a cut-off valve 70 is inserted between the latter and the main control 11 (Fig. 1) in such manner that upon depressing the displacing button 71 the suction line is re-established to the exclusion of the automatic control. The valve casing 72 has passages 12' connected to the motor and its main control and like passages 56' and 57' connected to the automatic control. Ports 73 and 74 in the slide valve 79 normally maintain communication through the automatic control but upon actuation of the displacing button the valve will interrupt such communication and cause a recess 75 to bridge the two passages 12'. A detent 76 serves to hold the cut-off valve in either of its two positions.

The window system insures a parked automobile being left with its windows closed, the operation being performed incidental to the parking maneuvers. Nevertheless, the system may be rendered wholly manual when desired. The system is practical and efficient, and while the foregoing description has been given in detail it is not the intention thereby to restrict the invention, the principles of which may be incorporated in other physical embodiments without departing from the spirit or scope as defined in the appended claims.

What is claimed is:

1. A motor vehicle having a window system including a fluid motor having a member operable by a pressure differential for closing a connected window, a pressure line having branches leading to the motor to normally balance said member, a control valve in the pressure line operable to vent the motor selectively at either side of said member and thereby effect an operating pressure differential, means operable in a definite path to effect a parking of the vehicle, and an auxiliary control valve located in one branch of the pressure line between the first control and the motor and in the path of said parking means for being operated automatically by the latter during operation thereof, both of said control valves normally providing constant communication between the motor and a source of operating pressure and each selectively operable to vent the motor to the atmosphere, said auxiliary control valve when venting also operating to close its communication with the first control valve.

2. A motor vehicle having a window system including a fluid motor having a member operable by a pressure differential for closing a connected window, a pressure line having branches leading to the motor to normally balance said member, a control valve in the pressure line operable selectively to provide an operating pressure differential for actuating the member in either direction to open or close the window, an auxiliary control valve in one branch operable to provide a window closing pressure differential on said member, and means operable to effect a parking of the vehicle and including a door latch having a receding movement upon the closing of its door to operate the auxiliary control valve.

3. A motor vehicle having a window system including a fluid motor operable for closing a connected window, a pressure line to the motor, a control valve in the pressure line operable to energize the motor, means operable to effect a parking of the vehicle, said parking means including a door latch operable upon the closing of its door to operate the control valve, an actuator having a path of movement in which it is operable by the latch to actuate the control valve, and means for displacing the actuator from its path to render it inoperable by said latch.

4. A motor vehicle having a window system including a fluid motor operable for closing a connected window, a pressure line to the motor, a control valve in the pressure line operable to energize the motor, means operable to effect a parking of the vehicle, said parking means including a door latch operable upon the closing of its door to operate the control valve, an actuator pivotally mounted on the latch and adapted to be pushed thereby to actuate the control valve, and means for angularly displacing the actuator to an inoperative position.

5. A motor vehicle having a window system including a fluid motor operable for closing a connected window, a pressure line to the motor, a control valve in the pressure line operable to energize the motor, means operable to effect a parking of the vehicle, and an auxiliary control valve also connected into the pressure line and operable to energize the motor independently of the first control valve, said parking means including a presettable member operable during the parking of the vehicle to actuate the auxiliary control valve upon rendering the door locking mechanism operative.

6. A motor vehicle having a window system including a fluid motor operable for closing a connected window, a pressure line to the motor, a control valve in the pressure line operable to energize the motor, means operable to effect a parking of the vehicle, and an auxiliary control valve also connected into the pressure line and operable to energize the motor independently of the first control valve, said parking means including manually preset means operable subsequently to actuate the auxiliary control valve.

7. A motor vehicle having a window system including a fluid motor operable for closing a connected window, a pressure line to the motor, a control valve in the pressure line operable to energize the motor, means operable to effect a parking of the vehicle, and an auxiliary control valve also connected into the pressure line and operable to energize the motor independently of the first control valve, said parking means including manually preset means operable by the closing of a vehicle door to actuate the auxiliary control valve.

8. A motor vehicle having a window system including a fluid motor, said motor having a member operable back and forth by reversing the pressure differential thereon for opening and closing a connected window, a pressure line having branches leading to the motor at opposite sides of said member normally to balance the latter, control valve means in the pressure line normally connecting both sides of the motor thereto and operable to vent the motor selectively at either side of said member for effecting the desired operating pressure differential in either direction, an auxiliary control valve in one branch normally maintaining the latter in open communication with said control valve means and operable to vent one side only of the motor for creating a window closing pressure differential on said member, means operable to effect a parking of the vehicle and simultaneously actuate the auxiliary control valve for closing any open window, and means operable to preclude the operation of said auxiliary control valve by said parking means.

ERWIN C. HORTON.

REFERENCES CITED

The following references are of record in the file of this patent:

UNITED STATES PATENTS

| Number | Name | Date |
| --- | --- | --- |
| 2,248,379 | Parsons | July 8, 1941 |
| 2,124,037 | Lavigne | July 19, 1938 |
| 1,938,502 | Steindler et al. | Dec. 5, 1933 |
| 1,991,611 | Gano, Jr. | Feb. 19, 1935 |
| 2,105,830 | Aiken | Jan. 18, 1938 |
| 2,104,639 | Dall | Jan. 4, 1938 |
| 2,334,031 | Rappl | Nov. 9, 1943 |
| 2,093,201 | Love | Sept. 14, 1937 |
| 2,146,638 | Magid | Feb. 7, 1939 |

FOREIGN PATENTS

| Number | Country | Date |
| --- | --- | --- |
| 319,752 | British | |